(12) United States Patent
Asano et al.

(10) Patent No.: US 10,272,752 B2
(45) Date of Patent: Apr. 30, 2019

(54) ROOF APPARATUS FOR VEHICLE AND VEHICLE INCLUDING THE SAME

(71) Applicant: AISIN SEIKI KABUSHIKI KAISHA, Kariya-shi, Aichi-ken (JP)

(72) Inventors: Taiki Asano, Toyota (JP); Yuya Aoki, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/704,624

(22) Filed: Sep. 14, 2017

(65) Prior Publication Data

US 2018/0229592 A1 Aug. 16, 2018

(30) Foreign Application Priority Data

Feb. 15, 2017 (JP) .................................. 2017-026080

(51) Int. Cl.
*B60J 7/00* (2006.01)
*B60J 7/02* (2006.01)
*B60J 7/043* (2006.01)

(52) U.S. Cl.
CPC ................. *B60J 7/02* (2013.01); *B60J 7/022* (2013.01); *B60J 7/043* (2013.01)

(58) Field of Classification Search
CPC ............... B60J 7/02; B60J 7/022; B60J 7/043
USPC ........................................ 296/216.06–216.08
See application file for complete search history.

(56) References Cited

U.S. PATENT DOCUMENTS

| 5,048,890 | A | * | 9/1991 | Masuda | ................... | B60J 7/022 |
| | | | | | | 296/216.08 |
| 2006/0261641 | A1 | * | 11/2006 | Ida | ........................... | B60J 7/022 |
| | | | | | | 296/216.08 |
| 2009/0127891 | A1 | * | 5/2009 | Hirata | ...................... | B60J 7/022 |
| | | | | | | 296/216.08 |
| 2011/0254322 | A1 | * | 10/2011 | Adamski | .................. | B60J 7/022 |
| | | | | | | 296/216.08 |

FOREIGN PATENT DOCUMENTS

JP          2014-24475          2/2014

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A roof apparatus for a vehicle includes: a pair of guide rails that is disposed in each of both edge portions of an opening formed in a roof of a vehicle body in a width direction of a vehicle and extends in a front-and-rear direction of the vehicle; a frame that includes a main body portion disposed below the guide rails in an up-and-down direction of the vehicle and an extension portion extending in a width direction of the vehicle, and that is disposed so as to be bridged over the pair of guide rails; and a pair of brackets which is fixed to one of the frame and the pair of guide rails and is configured to come into contact with the other of the frame and the pair of guide rails, and in which the frame and the pair of guide rails are integrally formed.

10 Claims, 6 Drawing Sheets

ROOF APPARATUS FOR VEHICLE AND VEHICLE INCLUDING THE SAME

CROSS REFERENCE TO RELATED APPLICATIONS

This application is based on and claims priority under 35 U.S.C. § 119 to Japanese Patent Application 2017-026080, filed on Feb. 15, 2017, the entire contents of which are incorporated herein by reference.

TECHNICAL FIELD

This disclosure relates to a roof apparatus for a vehicle which moves movable panel and a vehicle including the roof apparatus for a vehicle.

BACKGROUND DISCUSSION

A technology described in JP 2014-24475 (Reference 1) is known as a roof apparatus for a vehicle.

The roof apparatus for a vehicle described in Reference 1 includes a pair of guide rails for guiding a movable panel and a frame for connecting the pair of guide rails. One end of the frame is welded to one guide rail and the other end of the frame is welded to the other guide rail.

In another example, in order to improve rigidity of a vehicle body, a frame of a roof apparatus for a vehicle may be attached to the vehicle body so as to bridge both side portions of the vehicle body. Specifically, a pair of guide rails is attached between both ends of the frame, one end of the frame is fastened to one side in a width direction of a vehicle, and the other end of the frame is fastened to the other side in the width direction of the vehicle.

However, in a case of a roof apparatus for a vehicle in which a frame is fixed to a pair of guide rails, if a pair of guide rails is fastened to predetermined locations of the vehicle body and the frame is fastened so as to be bridged on both sides of the vehicle, distortion may occur in the roof apparatus for a vehicle. Thus, the pair of guide rails and the frame are independently fastened to the vehicle body.

However, in the roof apparatus for a vehicle, there is room for improvement with respect to the number of assembly steps with the vehicle body.

SUMMARY

A roof apparatus for a vehicle according to an aspect of this disclosure includes a pair of guide rails that is disposed in each of both edge portions of an opening which is formed in a roof of a vehicle body in a width direction of a vehicle and extends in a front-and-rear direction of the vehicle; a frame that includes a main body portion which is disposed below the guide rails in an up-and-down direction of the vehicle and an extension portion which extends in a width direction of the vehicle, and that is disposed so as to be bridged over the pair of guide rails; and a pair of brackets which is fixed to one of the frame and the pair of guide rails and is configured to come into contact with the other of the frame and the pair of guide rails, and in which the frame and the pair of guide rails are integrally formed.

A vehicle according to an aspect of this disclosure includes a roof apparatus for a vehicle and a vehicle body. The roof apparatus for the vehicle includes a pair of guide rails that is disposed in each of both edge portions of an opening which is formed in a roof of a vehicle body in a width direction of a vehicle and extends in a front-and-rear direction of the vehicle, a frame that includes a main body portion which is disposed below the guide rails in an up-and-down direction of the vehicle and an extension portion which extends in a width direction of the vehicle, and that is disposed so as to be bridged over the pair of guide rails, and a pair of brackets which is fixed to one of the frame and the pair of guide rails and is configured to come into contact with the other of the frame and the pair of guide rails, and in which the frame and the pair of guide rails are integrally formed. The frame and the pair of guide rails of the roof apparatus for a vehicle are attached to the vehicle body in a separation state or a contact state where the frame and the pair of guide rails are not pressed by each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

A roof apparatus for a vehicle according to a first embodiment will be described with reference to FIGS. 1 to 10.

In the following description, "an up-and-down direction of a vehicle" in a vehicle indicates a direction in a vertical direction when the vehicle is disposed on a flat ground. "An up-and-down direction DZ of a vehicle" in a roof apparatus of a vehicle is a direction in an up-and-down direction of a vehicle at a reference posture, in a state where a posture at the time of mounting the roof apparatus for a vehicle on the vehicle is defined as the reference posture. In addition, when being simply referred to as "above" or "below", the "above"

and the "below" respectively indicate above and below in the up-and-down direction of a vehicle in the reference posture of the roof apparatus for a vehicle.

"A front-and-rear direction DY of a vehicle" in the roof apparatus for a vehicle 3 is a direction in a front-and-rear direction of a vehicle when the roof apparatus for a vehicle 3 is in the reference posture.

"A width direction DX of a vehicle" in the roof apparatus for a vehicle 3 is a direction in a width direction of a vehicle when the roof apparatus for a vehicle 3 is in the reference posture.

Figure 1:
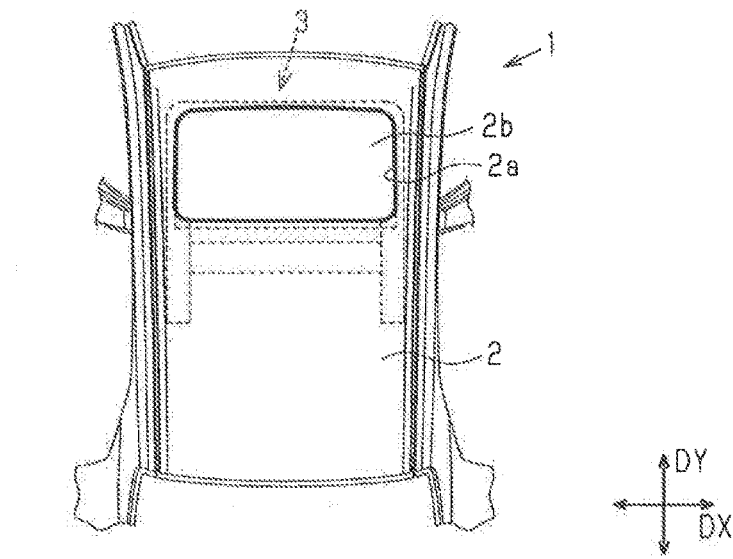
FIG. 1 is a plan view of a vehicle body including a roof apparatus for a vehicle according to a first embodiment.

As illustrated in FIG. 1, the roof apparatus for a vehicle 3 is attached to a vehicle body 1. The roof apparatus for a vehicle 3 moves a panel (hereinafter, referred to as "a movable panel 2b") for opening and closing an opening 2a of a roof 2 of the vehicle body 1. The roof apparatus for a vehicle 3 moves the movable panel 2b in the front-and-rear direction DY of a vehicle. The movable panel 2b is attached to a link mechanism 40 that slides on a guide rail 10. The link mechanism 40 moves in the front-and-rear direction DY of a vehicle through a transmission member (for example, a toothed belt or a cable) that transmits power of a motor 41. In addition, while moving to a rear direction of the front-and-rear direction DY of a vehicle, the link mechanism 40 places the movable panel 2b in a predetermined posture and disposes the movable panel 2b in a predetermined location (for example, an upper side of the roof 2) with respect to the roof 2.

Figure 2:
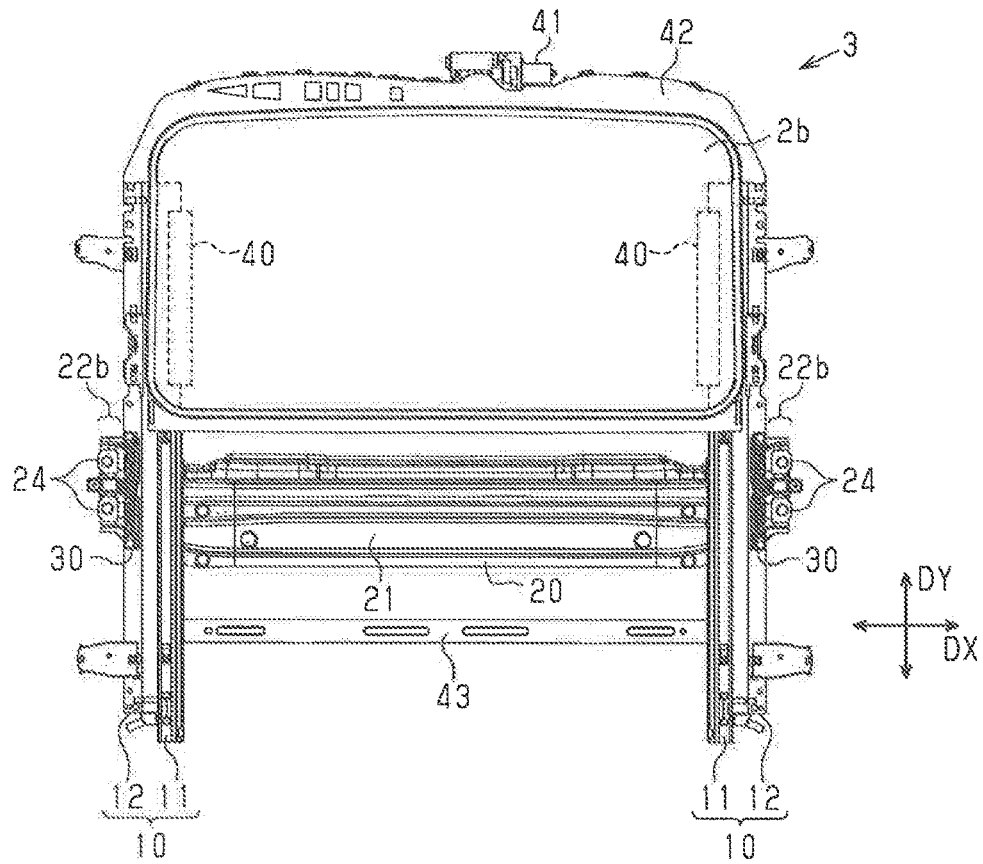
FIG. 2 is a plan view of the roof apparatus of a vehicle which is viewed from above.

As illustrated in FIG. 2, the roof apparatus for a vehicle 3 includes a pair of guide rails 10 for guiding the movable panel 2b in the front-and-rear direction DY of a vehicle, a frame 20 which is disposed so as to be bridged over the pair of guide rails 10, and a bracket 30 which integrally configures the pair of guides and the frame 20. The integral configuration indicates, for example, an engagement state in which not only the frame 20 is fixed to the guide rails 10 so as not to be relatively movable by fastening, welding, or brazing the frame 20 to the guide rails 10 but also a distance between the frame 20 and the guide rail 10 is held within a predetermined distance so as to be separable.

The roof apparatus for a vehicle 3 may further include the link mechanism 40, a motor 41 for driving the link mechanism 40, a front housing 42, and an auxiliary member 43 for maintaining an interval between the pair of guide rails 10. The motor 41 is attached to the front housing 42. The front housing 42 connects front ends of the pair of guide rails 10 to each other. A transmission member (for example, a belt) for transmitting power of the motor 41 to the link mechanism 40 is installed in the front housing 42. The auxiliary member 43 connects the pair of guide rails 10 to each other at a location behind the frame 20 in the front-and-rear direction DY of a vehicle.

As illustrated in FIG. 1, the guide rail 10 is attached to the roof 2 of the vehicle body 1. The guide rails 10 are respectively disposed at both edge portions of the opening 2a in the width direction DX of a vehicle and extend in the front-and-rear direction DY of a vehicle.

As illustrated in FIG. 2, the guide rail 10 includes a rail portion 11 which is a portion where sliding components of the link mechanism 40 move, and an edge portion 12 which is provided on an outer side of the rail portion 11 in the width direction DX of a vehicle. The edge portion 12 is fastened to the roof 2 of the vehicle body 1. In addition, a notch 14 recessed inward in the width direction DX of a vehicle is provided in the edge portion 12 (refer to FIG. 5), A slit 15 extending forward is provided in a front end of the notch 14. Another slit 15 extending rearward is provided in a rear end of the notch 14. The periphery of the front end of the notch 14 and the periphery of the rear end of the notch 14 configure contacted portions 16 with which contacting portions 32 (refer to below description) of the bracket 30 are in contact.

The frame 20 is attached to the vehicle body 1. Specifically, each of both end portions 22b and 22b of the frame 20 is fastened to a peripheral portion of a pillar of the vehicle body 1.

The frame 20 strengthens strength of the vehicle body against impact from a side surface of a vehicle. The frame 20 is provided with a plurality of grooves extending in the width direction DX of a vehicle so as to improve bending strength. The frame 20 is configured as, for example, a stacked body of two metal plates 20a and 20a. Both end portions 22b and 22b of the frame 20 are provided with fastening portions 24 fastened to the vehicle body 1.

If the frame 20 is fastened to the vehicle body 1, the frame 20 is bridged on both sides of the vehicle body 1. Accordingly, since impact from the side surface of the vehicle body is directly transmitted to the frame 20, recess of the side surface of the vehicle body is suppressed. In addition, if the frame 20 is fastened to the vehicle body 1, the frame 20 and the guide rail 10 are separated from each other, or come into contact with each other such that the frame 20 and the guide rail 10 do not exert a force.

A reason why the frame 20 and the guide rail 10 are attached to the vehicle body as described above is as follows. If a structure is provided in which the frame 20 is fixed to the guide rail 10 as in the related art, there are following problems. That is, an assembly in which the frame 20 is fixed to the guide rail 10 has two fastening portions included in the pair of guide rails 10 and two fastening portions in both ends of the frame 20, that is, at least four fastening portions, but, actually, a positional relationship of the four fastening portions may be deviated from a typical positional relationship on a design. In this case, if the assembly is fastened to the vehicle body 1, the assembly is distorted, the guide rail 10 is deformed, and stress remains in a fixed portion of the guide rail 10 and the frame 20. In particular, if rigidity of the frame 20 is high, deformation and residual stress of the guide rail 10 increases. In order to eliminate or reduce this, the frame 20 and the pair of guide rails 10 are separated from each other, or the frame 20 and the guide rail 10 are attached to the vehicle body 1 so as to come into contact with each other without exerting a force on each other, as described above.

Figure 3:
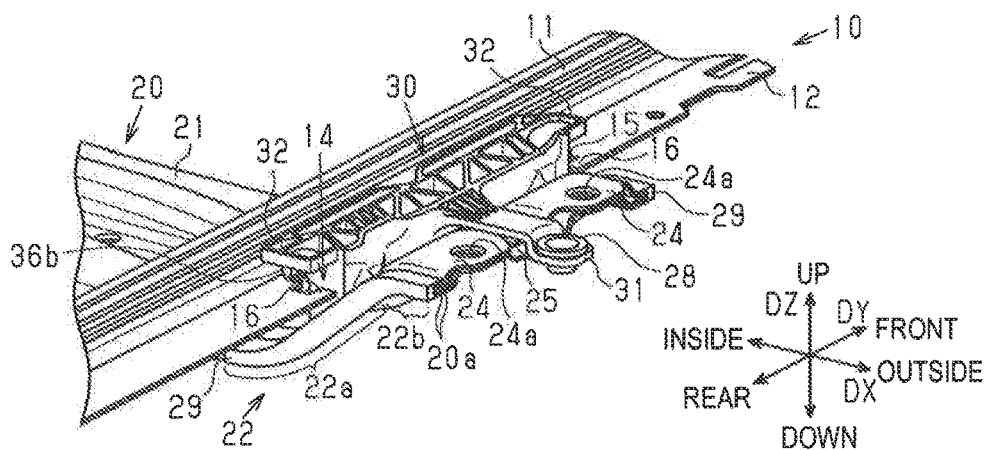
FIG. 3 is a perspective view of a contacting portion between a guide rail and a frame which is viewed from above.
Figure 4:
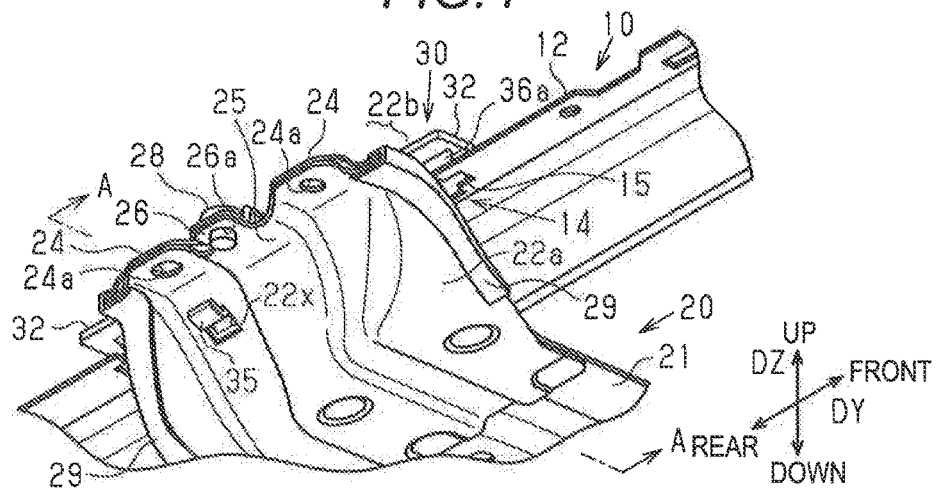
FIG. 4 is a perspective view of the contacting portion between the guide rail and the frame which is viewed from below.

The frame 20 will be described with reference to FIGS. 3 and 4.

The frame 20 includes a main body portion 21 disposed between the pair of guide rails 10 in the width direction DX of a vehicle and an extension portion 22 extending outward from the main body portion 21. The extension portion 22 includes an inclination portion 22a extending outward from the main body portion 21 and an end portion 22b that is a portion ahead of the inclination portion 22a. The extension portion 22 is disposed on an outer side more than the guide rail 10. The main body portion 21 and the extension portion 22 can be integrally formed. In addition, the main body portion 21 and the extension portion 22 may be configured as separate members, and in this case, the frame 20 is configured as a combined body of the main body portion 21 and the extension portion 22.

The main body portion 21 is disposed below the pair of guide rails 10 in the up-and-down direction DZ of a vehicle. The inclination portion 22a of the extension portion 22 of the frame 20 is inclined upward in the up-and-down direction DZ of a vehicle.

The extension portion 22 of the frame 20 is provided with a hook portion 22x engaged with a claw 35 (refer to below description) of the bracket 30. The hook portion 22x is configured as, for example, a through-hole or a notch. By engaging the claw 35 of the bracket 30 with the hook portion 22x, the bracket 30 is prevented from swinging with respect to the frame 20 and a location of the bracket 30 is stabilized with respect to the frame 20.

The frame 20 has a fastening portion 24 fastened to the vehicle body 1. Two fastening portions 24 are provided in the end portion 22b of the frame 20. The fastening portion 24 has a fastening hole 24a through which a fastening member such as a bolt is inserted. An intermediate portion 25 between the two fastening portions 24 is recessed downward. An arm portion 33 (refer to below description) of the bracket 30 is disposed in the intermediate portion 25. A depth of the intermediate portion 25 is larger than a thickness of the arm portion 33 of the bracket 30. Accordingly, the fastening portion 24 is located above the arm portion 33 of the bracket 30. By this structure, the fastening portion 24 of the frame 20 is fastened to the vehicle body 1 without being hindered by presence of the arm portion 33 of the bracket 30.

In addition, a fixed portion 26 to which a fixing portion 31 of the bracket 30 is fixed is provided in the end portion 22b of the frame 20. The fixed portion 26 extends outward in the width direction DX of a vehicle from the intermediate portion 25 of the frame 20. The fixed portion 26 is located below the intermediate portion 25 in the up-and-down direction DZ of a vehicle. The fixed portion 26 has a fixation hole 26a through which a fastening member 28 is inserted. If the fixing portion 31 of the bracket 30 is fixed to the fixed portion 26 of the frame 20 by the fastening member 28, a head portion of the fastening member 28 is located below the fastening portion 24 of the frame 20 (refer to FIG. 10). This configuration is a structure for preventing the head portion of the fastening member 28 from becoming an obstacle when the fastening portion 24 of the frame 20 is fastened to the vehicle body 1.

It is preferable that a cushioning member 29 formed of a resin is attached to the extension portion 22 of the frame 20. A reason why the cushioning member 29 is attached is that, when the frame 20 is attached to the vehicle body 1, the extension portion 22 of the frame 20 can hit the roof 2 thereby damaging the roof 2 and the cushioning member prevents the roof from being damaged.

The bracket 30 will be described with reference to FIGS. 6 to 9.

The bracket 30 is configured by a resin, or a composite material of the resin and a metal member. The bracket 30 is fixed to one of the frame 20 and the guide rail 10, and is in contact with the other of the frame 20 and the guide rail 10. In each embodiment, a member to which the bracket 30 is fixed among the frame 20 and the guide rail 10 is referred to as "a bracket supporting body". A member with which the bracket 30 is in contact among the frame 20 and the guide rail 10 is referred to as "a bracket-contacted body".

In the present embodiment, the bracket 30 is fixed to the frame 20 serving as a bracket supporting body and is in contact with the guide rail 10 serving as a bracket-contacted body. In the bracket 30, the frame 20 and the pair of guide rails 10 are integral with each other, based on the contact with the guide rails 10.

Figure 6:
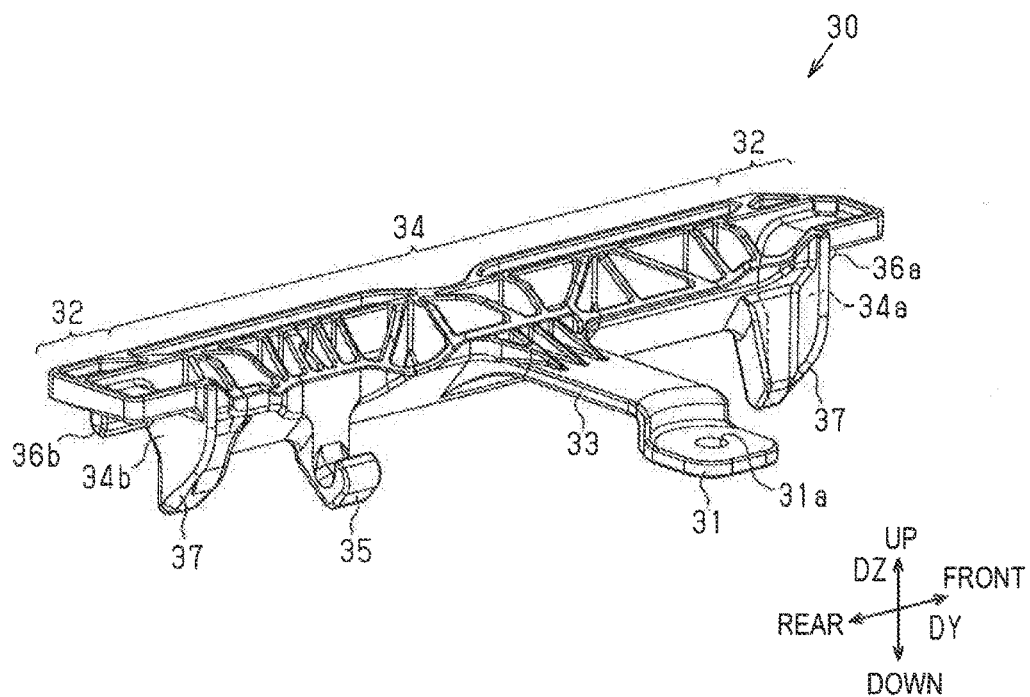
FIG. 6 is a perspective view of a bracket.
Figure 7:
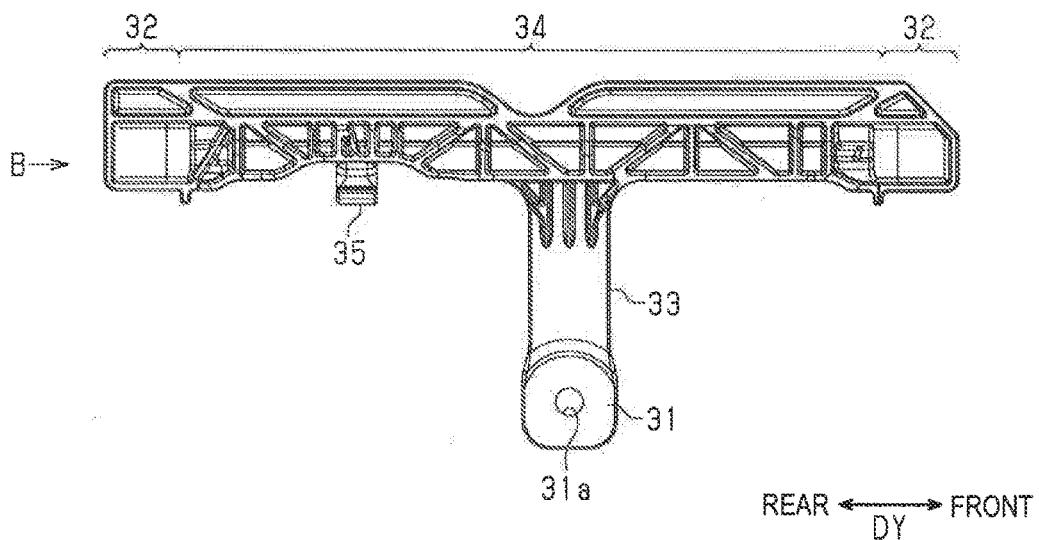
FIG. 7 is a plan view of the bracket viewed from above.

As illustrated in FIGS. 6 and 7, the bracket 30 includes at least the fixing portion 31 fixed to the frame 20, and a contacting portion 32 in contact with the guide rail 10. In the present embodiment, the bracket 30 further includes an insertion portion 34 (refer to below description), and the fixing portion 31 and the insertion portion 34 are connected to each other by the arm portion 33. The contacting portion 32 is provided in the insertion portion 34. As described above, the arm portion 33 is disposed in the intermediate portion 25 in the fastening portion 24 of the frame 20.

The fixing portion 31 is fixed to the fixed portion 26 of the frame 20. The fixing portion 31 includes a fixation hole 31a. The fixing portion 31 of the bracket 30 and the fixed portion 26 of the frame 20 are fastened to each other by the fastening member 28 which is inserted through both the fixing holes 31a and 26a. The fastening member 28 is, for example, a rivet or the like.

The insertion portion 34 is inserted through the notch 14 of the guide rail 10. A front surface 34a of the insertion portion 34 is disposed at a location separated by a predetermined distance from a front edge of the notch 14, A rear surface 34b of the insertion portion 34 is disposed at a location separated by a predetermined distance from a rear edge of the notch 14. A location of the guide rail 10 with respect to the frame 20 in the front-and-rear direction DY of a vehicle is regulated by a contact between the front surface 34a and the rear surface 34b of the insertion portion 34 and the front edge and the rear edge of the notch 14 of the guide rail 10.

Two contacting portions 32 and 32 are provided in the insertion portion 34. One of the contacting portions 32 protrudes forward from an upper portion of the insertion portion 34 and is disposed above the contacted portion 16 around a front end of the notch 14 of the guide rail 10. The other of the contacting portions 32 protrudes rearward from the upper portion of the insertion portion 34 and is disposed above the contacted portion 16 around a rear end of the notch 14. In addition, a projection portion 36a protruding forward is provided on the front surface 34a of the insertion portion 34, and a projection portion 36b protruding rearward is provided on the rear surface 34b of the insertion portion 34.

Figure 5:
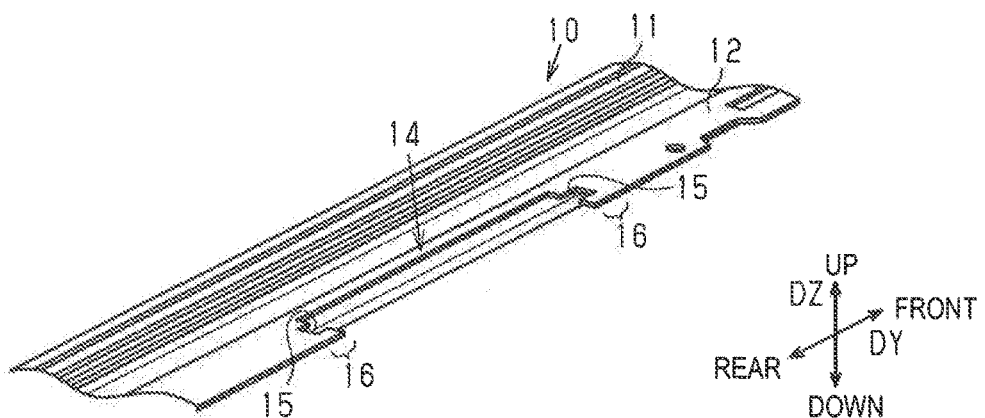
FIG. 5 is a partial perspective view of the guide rail.

As illustrated in FIG. 5, the slit 15 through which the projection portions 36a and 36b are inserted is provided in the notch 14 of the guide rail 10.

When the pair of guide rails 10 is lifted and the contacting portion 32 of the bracket 30 comes into contact with the contacted portion 16 of the guide rail 10, the projection portion 36a ahead of the insertion portion 34 of the bracket 30 is inserted through the slit 15 of the front end in the notch 14 of the guide rail 10. The projection portion 36b behind the insertion portion 34 is inserted through the slit 15 of the rear end in the notch 14 of the guide rail 10. A location of the guide rail 10 with respect to the frame 20 in the width direction DX of a vehicle is regulated by a contact between the projection portions 36a and 36b and the slit 15.

Figure 8:
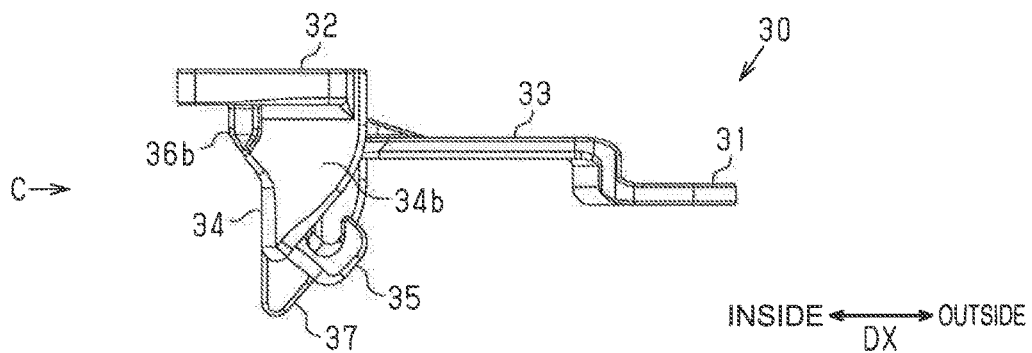
FIG. 8 is a rear view of the bracket viewed from an arrow B in FIG. 7.
Figure 9:
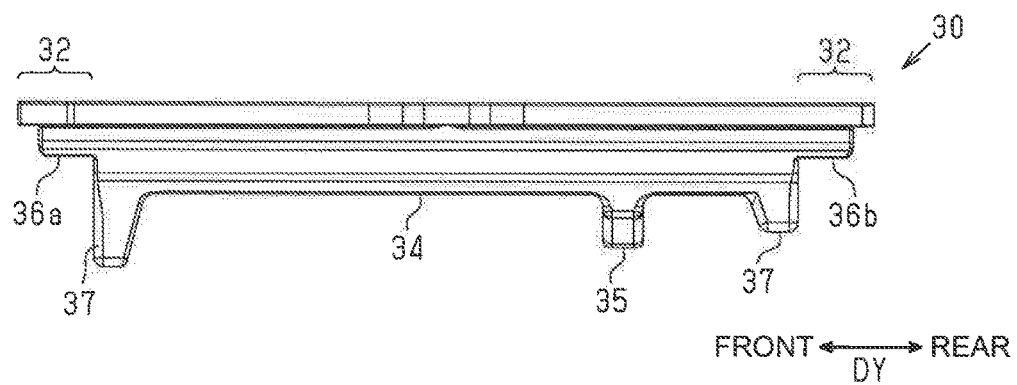
FIG. 9 is a side view of the bracket viewed from an arrow C in FIG. 8.

As illustrated in FIGS. 6, 8, and 9, a pair of contact portions 37 in contact with the extension portion 22 of the frame 20 and the claw 35 are provided in on an outer surface of the insertion portion 34 in the width direction DX of a vehicle. The pair of contact portions 37 is disposed to be separated from each other in the front-and-rear direction. The claw 35 extends above while extending outward from the outer surface of the insertion portion 34 so as to be hooked into the hook portion 22x in the extension portion 22 of the frame 20.

As the fixing portion 31 is fixed to the fixed portion 26 of the frame 20, the contact portion 37 comes into contact with the extension portion 22 of the frame 20, and the claw 35 is hooked into the hook portion 22x of the extension portion 22 of the frame 20, the bracket 30 is prevented from swing, and thereby, the bracket 30 is fixed to the frame 20 in a stable state.

Figure 10:
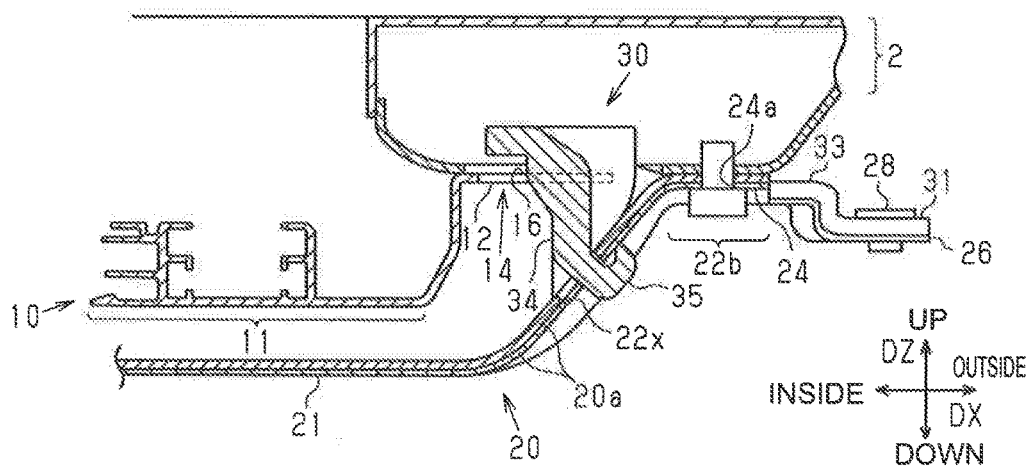
FIG. 10 is a cross-sectional view of the roof apparatus for a vehicle taken along line X-X in FIG. 4.

A method of attaching the roof apparatus for a vehicle 3 will be described with reference to FIG. 10.

When the roof apparatus for a vehicle 3 is attached to the vehicle body 1, the pair of guide rails 10 is lifted. If the guide rails 10 are lifted, the contacted portion 16 of each of the guide rails 10 comes into contact with the contacting portion 32 of the bracket 30 from below. Thereby, the frame 20 is supported by the guide rails 10 to be lifted. At this time, the frame 20 is positioned with respect to the guide rails 10 through the insertion portion 34 of the bracket 30. If the pair of guide rails 10 is disposed in a guide rail attaching location in the vehicle body 1 in accordance with the positioning, the frame 20 is disposed directly under a frame attaching location in the vehicle body 1. In an attaching procedure, the pair of guide rails 10 is first attached to the vehicle body 1. Thereafter, the frame 20 is lifted upward from the guide rails 10 and is attached to the vehicle body 1. At this time, the frame 20 and the guide rails 10 are spaced from each other so as not to exert a force on each other (refer to FIG. 10). Alternatively, the frame 20 and the guide rail 10 come into contact with each other so as not to exert a force on each other. As described above, the pair of guide rails 10 and the frame 20 are independently attached to the vehicle body 1 in a state where they do not exert a force on each other.

An operation of the roof apparatus for a vehicle 3 will be described.

Since the pair of guide rails 10 and the frame 20 can be integrally formed in a temporarily fixed state through the bracket 30, the pair of guide rails 10 and the frame 20 can be integrally lifted. Accordingly, it is possible to efficiently attach the roof apparatus for a vehicle 3 to the vehicle body 1, compared with a case where the pair of guide rails 10 and the frame 20 are individually attached to the vehicle body 1.

Effects of the roof apparatus for a vehicle 3 according to the present embodiment will be described.

(1) The roof apparatus for a vehicle 3 includes the frame 20, the pair of guide rails 10, and the pair of brackets 30. The brackets 30 are fixed to the frame 20 and can come into contact with the pair of guide rails 10, and the frame 20 and the pair of guide rails 10 are integrally formed.

Since the frame 20 and the pair of guide rails 10 can be integrally formed through the brackets 30 and the frame 20 can be temporarily fixed to the guide rails 10, the frame 20 and the guide rails 10 can be integrally supported. Accordingly, the frame 20 and the guide rails 10 are easily assembled with a vehicle and the number of assembly steps is reduced.

(2) The contacting portion 32 of the bracket 30 is disposed on the contacted portions 16 of the guide rails 10. Accordingly, by moving the pair of guide rails 10 upward, both can be integrally formed. As such, since the pair of guide rails 10 and the frame 20 can be formed simply and integrally and are simultaneously lifted, it is possible to reduce a labor when the pair of guide rails 10 and the frame 20 are attached to the vehicle body 1.

(3) Specifically, in a separation state where the frame 20 and the guide rails 10 are separated from each other, the contacting portion 32 of the bracket 30 is disposed above the contacted portion 16 of the guide rail 10 in the up-and-down direction DZ of a vehicle. In addition, in an integration state where the frame 20 and the guide rails 10 are integrally formed, the contacted portion 16 of the guide rail 10 comes into contact with the contacting portion 32 of the bracket 30 from below in the up-and-down direction DZ of a vehicle.

Accordingly, if the pair of guide rails 10 is lifted, the contacted portions 16 of the guide rails 10 approach the contacting portions 32 of the bracket 30 from below and come into contact with the contacting portions 32, the frame 20 and the pair of guide rails 10 are integrally formed, and the frame 20 is lifted together with the guide rails 10.

(4) It is preferable that the bracket 30 includes a regulation portion that limits movement of the guide rails 10 in the front-and-rear direction DY of a vehicle. In the present embodiment, the regulation portion is configured as the insertion portion 34 of the bracket 30. Thereby, it is possible to define a positional relationship between the frame 20 and the guide rail 10.

(5) A positional relationship between the frame 20 and the guide rail 10 is defined by the following movement limit structure. The notch 14 is provided in the edge 12 of the guide rail 10. The bracket 30 has the insertion portion 34 inserted through the notch 14, and the contacting portion 32 of the bracket 30 is provided so as to extend toward the front and the rear of a vehicle in the front-and-rear direction DY of a vehicle in the insertion portion 34. Furthermore, the regulation portion of the bracket 30 is configured as the front surface 34a and the rear surface 34b in the insertion portion 34.

According to this configuration, the rear movement of the guide rail 10 is regulated by the contact between a front edge of the notch 14 and the front surface 34a of the insertion portion 34, and a front movement of the guide rail 10 is regulated by the contact between a rear edge of the notch 14 and the rear surface 34b of the insertion portion 34. By doing so, a positional relationship between the frame 20 and the guide rail 10 is defined in the front-and-rear direction DY of a vehicle.

(6) In addition, in the frame 20, the hook portion 22x is provided at a location with which the insertion portion 34 of the bracket 30 is in contact, and it is preferable that the claw 35 engaging with the hook portion 22x of the frame 20 is provided in the insertion portion 34 of the bracket 30. According to this configuration, the bracket 30 is prevented from swinging with respect to the frame 20, and a location of the bracket 30 with respect to the frame 20 is stabilized.

(7) The bracket 30 is formed of a resin. In this case, the fixing portion 31 of the bracket 30 and the frame 20 are fastened to each other by the fastening member 28. According to this configuration, heat is not applied to the bracket 30 in fastening the fixing portion 31 of the bracket 30 to the frame 20, and thus, there is no deformation of the bracket 30 due to the heat. If the bracket 30 is deformed, the disposition of the insertion portion 34 of the bracket 30 with respect to the frame 20 deviates from an initially planned setting location, and thereby a positional relationship between the frame 20 and the guide rail 10 may deviate from the defined positional relationship, but there is no thermal deformation of the bracket 30 in the aforementioned configuration, such a situation is prevented from occurring.

Second Embodiment

A roof apparatus for a vehicle 3 according to a second embodiment will be described with reference to FIGS. 11 to 13. FIG. 13 is a cross-sectional view of the roof apparatus for a vehicle 3 taken along a surface perpendicular to an extension direction of the guide rail 10 at a location including a fixing portion 131 (refer to below description) of the bracket 130.

The roof apparatus for a vehicle 3 according to the present embodiment is different from the roof apparatus for a vehicle 3 according to the first embodiment in an integrated structure of the frame 20 and the guide rail 10. This point will be described below. The same reference numerals or symbols will be attached to the configurations common to those in the first embodiment, among the configurations of the frame 20 and the guide rail 10.

Figure 11:
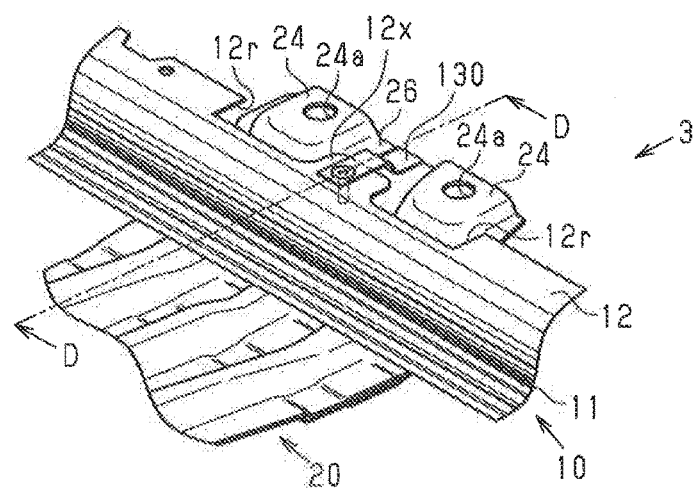
FIG. 11 is a perspective view of a contacting portion between a guide rail and a frame of a roof apparatus for a vehicle according to a second embodiment.
Figure 12:
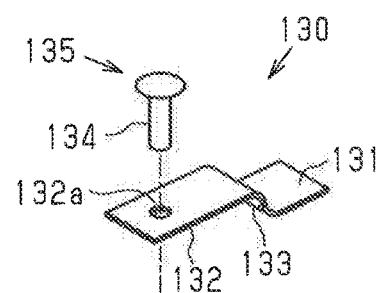
FIG. 12 is an exploded perspective view of a bracket.
Figure 13:
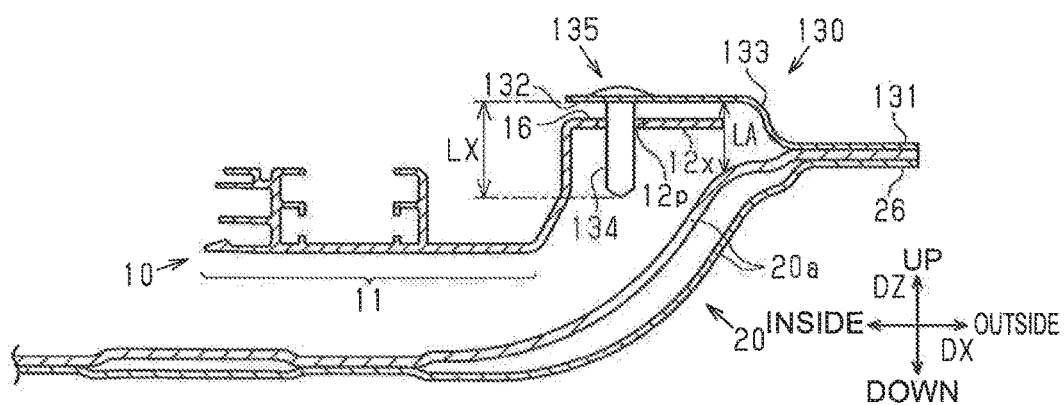
FIG. 13 is a cross-sectional view of a contacting portion taken along the line XIII-XIII in FIG. 11.

As illustrated in FIGS. 11 and 12, two notches 12r and 12r recessed inward in the width direction DX of a vehicle are provided in an edge portion 12 of the guide rail 10. A through-hole 12p is provided in the remaining portion 12x of the edge portion 12 remained between the two notches 12r and 12r. In the edge portion 12, the periphery of the through-hole 12p configures the contacted portion 16 with which a contacting portion 132 (refer to below description) of the bracket 130 is in contact. The two notches 12r and 12r are provided to prevent the edge portion 12 and the fastening portion 24 of the frame 20 from interfacing with each other.

The bracket 130 is fixed to the frame 20 serving as a bracket supporting body and is in contact with the guide rail 10 serving as a bracket-contacted body. In the bracket 130, at least the fixing portion 131 is configured by, for example, a metal member.

The bracket 130 includes at least the fixing portion 131 fixed to the frame 20 and the contacting portion 132 engaged with the guide rail 10. In the present embodiment, the bracket 130 further includes an arm portion 133 which connects the fixing portion 131 to the contacting portion 132. The fixing portion 131 is fixed to the fixed portion 26 of the frame 20 by welding. The contacting portion 132 of the bracket 130 is disposed above the through-hole 12p of the edge portion 12 of the guide rail 10. In addition, the contacting portion 132 includes a protrusion portion 134 extending downward in the up-and-down direction DZ of a vehicle. The protrusion portion 134 protrudes from a center portion of the contacting portion 132. The protrusion portion 134 is configured by a pin 135 inserted through a through-hole 132a provided in the center of the contacting portion 132. The pin 135 is, for example, a brush clip, a rivet, a screw, a simple pin, or the like. In a case of the screw, a screw groove matching the screw is provided in the through-hole 132a. In a case of the simple pin, the pin is brazed to the bracket 130 or is pressed to be fitted into the through-hole 132a.

As illustrated in FIG. 13, the protrusion portion 134 is inserted through the through-hole 12p of the edge portion 12 of the guide rail 10.

Since the protrusion portion 134 of the bracket 130 is inserted through the through-hole 12p of the guide rail 10, movements of the bracket 130 and the frame 20 with respect to the guide rail 10 are limited. By doing so, locations of the frame 20 and the guide rail 10 in the front-and-rear direction DY of a vehicle and in the width direction DX of a vehicle are defined.

A length LX of the protrusion portion 134 is longer than a distance (hereinafter, a movable distance LA) in which the guide rail 10 can move in the up-and-down direction DZ of a vehicle. By this configuration, the guide rail 10 and the protrusion portion 134 are engaged with each other regardless of the location of the guide rail 10 in the up-and-down direction DZ of a vehicle, and thus, a positional relationship between the guide rail 10 and the frame 20 is maintained. The movable distance LA of the guide rail 10 is defined as a distance between a first location where the edge portion 12 is in contact with the bracket 130 when the guide rail 10 is moved upward and a second location where the edge portion 12 is in contact with the extension portion 22 of the frame 20 when the guide rail 10 is moved downward.

An operation and effects of the roof apparatus for a vehicle 3 according to the present embodiment will be described.

(1) The contacting portion 132 of the bracket 130 is disposed above the through-hole 12p of the edge portion 12 of the guide rail 10. The protrusion portion 134 serving as a regulation portion is provided in the contacting portion 132 of the bracket 130 so as to be inserted through the through-hole 12p. Accordingly, movement of the guide rail 10 with respect to the frame 20 in the front-and-rear direction DY of a vehicle and in the width direction DX of a vehicle is regulated by a contact between the through-hole 12p and the protrusion portion 134. By doing so, a positional relationship between the frame 20 and the guide rail 10 is defined.

(2) At least the fixing portion 131 of the bracket 130 is configured by a metal. The fixing portion 131 of the bracket 130 and the frame 20 are coupled together by a welding structure. As such, the fixing portion 131 of the bracket 130 and the frame 20 are tightly coupled by the welding structure, and thus, there is no swing of the bracket 130 with respect to the frame 20, and the location of the bracket 130 with respect to the frame 20 is stabilized.

(3) In addition, the length LX of the protrusion portion 134 is longer than the distance (movable distance LA) where the guide rail 10 can move in the up-and-down direction DZ of a vehicle. When the length LX of the protrusion portion 134 is short, engagement between the protrusion portion 134 and the through-hole 12p of the guide rail 10 may be disengaged depending on lifting of the pair of guide rails 10, but, according to the aforementioned configuration, The engagement between the protrusion portion 134 and the through-hole 12p of the guide rail 10 is hard to be disengaged. Accordingly, an engagement relationship between the guide rail 10 and the frame 20 can be maintained regardless of the lifting of the guide rail 10.

Third Embodiment

Figure 14:
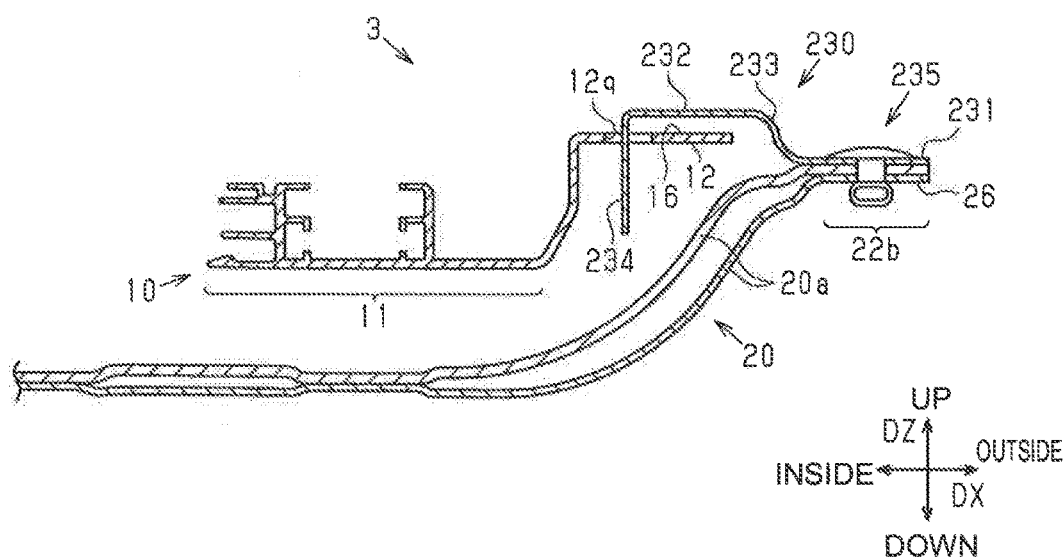
FIG. 14 is a sectional view of a contacting portion between a guide rail and a frame in a roof apparatus for a vehicle according to a third embodiment.

A roof apparatus for a vehicle 3 according to a third embodiment will be described with reference to FIG. 14. FIG. 14 is a sectional view of the roof apparatus for a vehicle 3 taken along a surface perpendicular to an extension direction of the guide rail 10 in a portion including a fixing portion 231 (refer to below description) of a bracket 230.

The roof apparatus for a vehicle 3 according to the present embodiment is different from the roof apparatus for a vehicle 3 according to the first embodiment in an integrated structure of the frame 20 and the guide rail 10. This point will be described below. The same reference numerals or symbols will be attached to the configurations common to those in the first embodiment, among the configurations of the frame 20 and the guide rail 10.

A through-hole 12q is provided in the edge portion 12 of the guide rail 10. In the edge portion 12, the periphery of the through-hole 12q configures the contacted portion 16 with which a contacting portion 232 (refer to below description) of the bracket 230 is in contact.

The bracket 230 is fixed to the frame 20 serving as a bracket supporting body and is in contact with the guide rail 10 serving as a bracket-contacted body. The bracket 230 is formed of a metal plate.

The bracket 230 includes a fixing portion 231 fixed to the guide rail 10 and a contacting portion 232 in contact with the guide rail 10. In the present embodiment, the bracket 230 further includes an arm portion 233 which connects the fixing portion 231 to the contacting portion 232. The fixing portion 231 is fixed to the fixed portion 26 of the frame 20 by a pin 235. The contacting portion 232 of the bracket 230 is disposed above the through-hole 12q of the edge portion 12 of the guide rail 10. In addition, the contacting portion 232 includes a protrusion portion 234 extending below the up-and-down direction DZ of a vehicle. The protrusion portion 234 protrudes from an end edge of the contacting portion 232. The protrusion portion 234 is formed by bending a metal member. The protrusion portion 234 is inserted through the through-hole 12q of the edge portion 12 of the guide rail 10.

An operation and effects of the roof apparatus for a vehicle 3 according to the present embodiment will be described.

The contacting portion 232 of the bracket 230 is disposed above the through-hole 12q of the edge portion 12 of the guide rail 10. The protrusion portion 234 serving as a regulation portion is provided in the contacting portion 232 of the bracket 230 so as to be inserted through the through-hole 12q.

According to this configuration, movement of the guide rail 10 in the front-and-rear direction DY of a vehicle and in the width direction DX of a vehicle is regulated with respect to the frame 20 by a contact between the through-hole 12q and the protrusion portion 234. By doing so, a positional relationship between the frame 20 and the guide rail 10 in the front-and-rear direction DY of a vehicle is defined.

Fourth Embodiment

Figure 15:
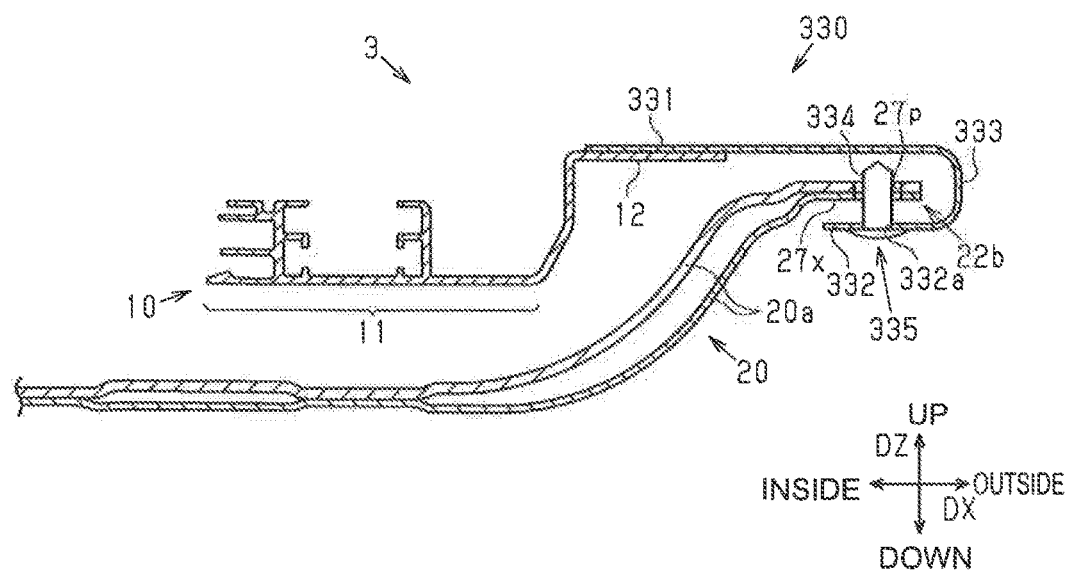
FIG. 15 is a sectional view of a contacting portion between a guide rail and a frame in a roof apparatus for a vehicle according to a fourth embodiment.

A roof apparatus for a vehicle 3 according to a fourth embodiment will be described with reference to FIG. 15. FIG. 15 is a sectional view of the roof apparatus for a vehicle 3 taken along a surface perpendicular to an extension direction of the guide rail 10 in a portion including a fixing portion 331 (refer to below description) of a bracket 330.

The roof apparatus for a vehicle 3 according to the present embodiment is different from the roof apparatus for a vehicle 3 according to the first embodiment in an integrated structure of the frame 20 and the guide rail 10. This point will be described below. The same reference numerals or symbols will be attached to the configurations common to those in the first embodiment, among the configurations of the frame 20 and the guide rail 10.

In the first embodiment, the bracket 30 is fixed to the frame 20, but in the present embodiment, the bracket 330 is fixed to the guide rail 10.

The bracket 330 is fixed to the guide rail 10 serving as a bracket supporting body and is in contact with the frame 20 serving as a bracket-contacted body. The bracket 330 is configured by a metal member.

Specifically, the bracket 330 includes a fixing portion 331 fixed to the guide rail 10 and a contacting portion 332 in contact with the frame 20. In the present embodiment, the bracket 330 further includes an arm portion 333 connecting the fixing portion 331 to the contacting portion 332. The fixing portion 331 is fixed to the edge portion 12 of the guide rail 10 by brazing or welding. The arm portion 333 extends outward in the width direction DX of a vehicle from the fixing portion 331, bends downward halfway, and bends inward in the width direction DX of a vehicle near a front end. The contacting portion 332 is provided in the front end of the arm portion 333. The contacting portion 332 is disposed under a contacted portion 27x of the frame 20. The contacted portion 27x of the frame 20 is configured on a lower side of an end portion 22b of the frame 20. A through-hole 27p is provided in the contacted portion 27x.

The contacting portion 332 of the bracket 330 includes a protrusion portion 334 extending above the up-and-down direction DZ of a vehicle. The protrusion portion 334 protrudes from a center portion of the contacting portion 332. The protrusion portion 334 is configured as a pin 335 inserted through a through-hole 332a provided in the center of the contacting portion 332. The pin 335 is, for example, a brush clip, a rivet, a screw, a simple pin, or the like. The protrusion portion 334 is inserted through the through-hole 27p of the frame 20.

An operation and effects of the roof apparatus for a vehicle 3 according to the present embodiment will be described.

The bracket 330 is fixed to the guide rail 10. In addition, the bracket 330 is in contact with the frame 20. In a separation state where the frame 20 and the guide rail 10 are separated from each other, the contacting portion 332 of the bracket 330 is disposed below the contacted portion 27x of the frame 20 in the up-and-down direction DZ of a vehicle. In an integration state where the frame 20 and the guide rail 10 are integrally formed, the contacting portion 332 of the bracket 330 comes into contact with the contacted portion 27x of the frame 20 from below in the up-and-down direction DZ of a vehicle.

In the separation state, if the pair of guide rails 10 is lifted, the contacting portion 332 of the bracket 330 approaches the contacted portion 27x of the frame 20 from below and comes into contact with the contacted portion 27x, the frame 20 and the pair of guide rails 10 are integrally formed, and the frame 20 is lifted together with the guide rails 10. As such, in the bracket 330 described in this embodiment, the frame 20 and the pair of guide rails 10 are integrally formed. Accordingly, the roof apparatus for a vehicle 3 according to the present embodiment substantially obtains the action and effects according to the first embodiment.

Other Embodiments

It is preferable that the vehicle body 1 includes the roof apparatus for a vehicle 3 according to any one of the aforementioned embodiments. As described in the first embodiment, in the vehicle body 1, the pair of guide rails 10 and the frame 20 are independently attached to the vehicle body 1 such that the pair of guide rails 10 and the frame 20 do not exert a force on each other. The force applied to the frame 20 is not applied to the guide rail 10 or is hard to be applied. Accordingly, there is no distortion of the guide rail 10 due to deformation or twist of the frame 20, or even if there is distortion, the degree of distortion is small. In addition, since the number of assembly steps in which members are assembled with the vehicle body in the roof apparatus for a vehicle 3 is reduced, it is possible to improve manufacturing efficiency of the vehicle body 1.

In the first embodiment, the notch 14 is provided in the edge portion 12 of the guide rail 10 as a movement limit structure that defines a positional relationship between the guide rail 10 and the frame 20, but the movement limit structure is not limited to this. For example, a through-hole or a recessed portion for defining a position of the insertion portion 34 of the bracket 30 can be provided in the edge portion 12 of the guide rail 10.

(1) A roof apparatus for a vehicle according to an aspect of this disclosure includes a pair of guide rails that is disposed in each of both edge portions of an opening which is formed in a roof of a vehicle body in a width direction of a vehicle and extends in a front-and-rear direction of the vehicle; a frame that includes a main body portion which is disposed below the guide rails in an up-and-down direction of the vehicle and an extension portion which extends in a width direction of the vehicle, and that is disposed so as to be bridged over the pair of guide rails; and a pair of brackets which is fixed to one of the frame and the pair of guide rails and is configured to come into contact with the other of the frame and the pair of guide rails, and in which the frame and the pair of guide rails are integrally formed.

According to this configuration, a frame and a pair of guide rails can be integrally formed through a bracket and the frame can be temporarily fixed to the guide rails, and thus, the frame and the guide rail can be integrally supported. Accordingly, the frame and the guide rails can be easily assembled with a vehicle, and the number of assembly steps can be reduced.

(2) In the roof apparatus for a vehicle, the bracket may include a fixing portion that is fixed to a bracket supporting body which is one of the frame and the pair of guide rails and a contacting portion that is in contact with a bracket-contacted body which is the other of the frame and the pair of guide rails, and the contacting portion of the bracket and the contacted portion of the bracket-contacted body may be disposed in an up-and-down direction of the vehicle.

According to this configuration, a contacting portion of a bracket and a contacted portion of a bracket-contacted body are disposed in an up-and-down direction of a vehicle, and thus, one of a pair of guide rails and a frame can be moved upward. Accordingly, the pair of guide rails and the frame can be integrally formed.

(3) In the roof apparatus for a vehicle, the bracket may be fixed to the frame serving as the bracket supporting body and be in contact with each of the guide rails serving as the bracket-contacted body, the contacting portion of the bracket may be disposed above the contacted portion of each of the guide rails in the up-and-down direction of the vehicle, in a separation state where the frame and the guide rails are separated from each other, and the contacted portion of each of the guide rails may come into contact with the contacting portion of the bracket from below in the up-and-down direction of the vehicle, in an integration state where the frame and the guide rails are integrally formed.

According to this configuration, if a pair of guide rails is lifted, a contacted portion of each of the guide rail approaches a contacting portion of a bracket from below, the contacted portion of each of the guide rail comes into contact with the contacting portion of the bracket, the frame and the pair of guide rails are integrally formed, and the frame is lifted together with the guide rails.

(4) In the roof apparatus for a vehicle, the bracket may further include a regulation portion that limits movement of the guide rails in the front-and-rear direction of the vehicle.

According to this configuration, a positional relationship between a frame and guide rails can be defined.

(5) In the roof apparatus for a vehicle, each of the guide rails may have an edge portion extending in the front-and-rear direction of the vehicle, a notch may be provided in the edge portion, the bracket may have an insertion portion which is inserted through the notch, and the contacting portion of the bracket may extend in the front and the rear of the insertion portion in the front-and-rear direction of the vehicle, and the regulation portion of the bracket is configured as a front surface and a rear surface in the insertion portion.

This configuration is an example of a movement limit structure that defines a positional relationship between a frame and guide rails, and a structure thereof is simplified.

(6) In the roof apparatus for a vehicle, a hook portion may be provided in a portion where the insertion portion of the bracket is in contact with in the frame, and a claw that engages with the hook portion of the frame may be provided in the insertion portion of the bracket.

According to this configuration, a bracket is prevented from swinging with respect to a frame, and a location of the bracket with respect to the frame is stabilized.

(7) In the roof apparatus for a vehicle, the bracket may be formed of a resin, and the fixing portion of the bracket and the frame may be fastened by a fastening member.

According to this configuration, heat is not applied to a bracket in fastening a fixing portion of the bracket to a frame, and thus, there is no deformation of the bracket due to heat.

(8) In the roof apparatus for a vehicle, each of the guide rails may have an edge portion extending in the front-and-rear direction of the vehicle, and a through-hole may be provided in the edge portion, and a protrusion portion serving as the regulation portion is provided in the contacting portion of the bracket so as to be inserted through the through-hole.

This configuration is an example of a movement limit structure that defines a positional relationship between a frame and guide rails, and a structure thereof is simplified.

(9) In the roof apparatus for a vehicle, a length of the protrusion portion of the bracket may be longer than a distance in which each of the guide rails is movable in the up-and-down direction of the vehicle. According to this configuration, engagement between the protrusion portion and the guide rails is hard to be separated.

(10) In the roof apparatus for a vehicle, at least the fixing portion in the bracket may be configured by a metal, and the fixing portion of the bracket and the frame may be coupled together by a welding structure.

According to this configuration, a fixing portion of a bracket and a frame are tightly coupled by a welding structure, and thus, there is no swing of the bracket with respect to the frame, and a location of the bracket with respect to the frame is stabilized.

(11) In the roof apparatus for a vehicle, the bracket may be fixed to each of the guide rails serving as the bracket supporting body and is in contact with the frame serving as the bracket-contacted body, the contacting portion of the bracket may be disposed below the contacted portion of the frame in the up-and-down direction of the vehicle, in a separation state where the frame and the guide rails may be separated from each other, and the contacting portion of the bracket may come into contact with the contacted portion of the frame from below in the up-and-down direction of the vehicle, in an integration state where the frame and the guide rails are integrally formed.

According to this configuration, if a pair of guide rails is lifted, a contacting portion of a bracket approaches a contacted portion of each of the guide rails from below, the contacting portion of the bracket comes into contact with the contacted portion of each of the guide rails, a frame and the pair of guide rails are integrally formed, and the frame is lifted together with the guide rails.

(12) A vehicle according to an aspect of this disclosure includes the roof apparatus for a vehicle according to any one of those described above; and a vehicle body, in which the frame and the pair of guide rails of the roof apparatus for a vehicle are attached to the vehicle body in a separation state or a contact state where the frame and the pair of guide rails are not pressed by each other. The roof apparatus for a vehicle According to this configuration, the number of assembly steps of a roof apparatus for a vehicle is reduced, and thus, it is possible to improve manufacturing efficiency of the vehicle.

According to the roof apparatus for a vehicle and the vehicle, it is possible to reduce the number of assembly steps.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A roof apparatus for a vehicle, comprising:
   a pair of guide rails that is disposed in each of both edge portions of an opening which is formed in a roof of a vehicle body in a width direction of a vehicle and extends in a front-and-rear direction of the vehicle;
   a frame that includes a main body portion which is disposed below the guide rails in an up-and-down direction of the vehicle and an extension portion which extends in a width direction of the vehicle, and that is disposed so as to be bridged between the pair of guide rails; and
   a pair of brackets associated with the frame and the pair of guide rails and connecting the frame and the pair of guide rails to one another,
   wherein the bracket includes a fixing portion and a contacting portion,
   the bracket further includes a regulation portion that limits movement of the guide rails in the front-and-rear direction of the vehicle,
   each of the guide rails has an edge portion extending in the front-and-rear direction of the vehicle, and a notch is provided in the edge portion,
   the bracket has an insertion portion which is inserted through the notch, and
   the contacting portion of the bracket extends in the front and the rear of the insertion portion in the front-and-rear direction of the vehicle, and the regulation portion of the bracket is configured as a front surface and a rear surface in the insertion portion.

2. The roof apparatus for a vehicle according to claim 1, wherein the fixing portion is fixed to the frame and the contacting portion is in contact with the pair of guide rails, and
   the contacting portion of the bracket and a contacted portion of the pair of guide rails are disposed in an up-and-down direction of the vehicle.

3. The roof apparatus for a vehicle according to claim 2, wherein
   the contacting portion of the bracket is disposed above the contacted portion of each of the guide rails in the up-and-down direction of the vehicle, in a separation state where the frame and the guide rails are separated from each other, and
   the contacted portion of each of the guide rails comes into contact with the contacting portion of the bracket from below in the up-and-down direction of the vehicle, in an integration state where the frame and the guide rails are connected.

4. The roof apparatus for a vehicle according to claim 1, wherein a hook portion is provided in a portion where the insertion portion of the bracket is in contact with in the frame, and
   a claw that engages with the hook portion of the frame is provided in the insertion portion of the bracket.

5. The roof apparatus for a vehicle according to claim 1, wherein the bracket is formed of a resin, and
   the fixing portion of the bracket and the frame are fastened by a fastening member.

6. A vehicle comprising:
   a roof apparatus for a vehicle;
   the roof apparatus for the vehicle, including:
      a pair of guide rails that is disposed in each of both edge portions of an opening which is formed in a roof of a vehicle body in a width direction of a vehicle and extends in a front-and-rear direction of the vehicle;
      a frame that includes a main body portion which is disposed below the guide rails in an up-and-down direction of the vehicle and an extension portion which extends in a width direction of the vehicle, and that is disposed so as to be bridged between the pair of guide rails; and
      a pair of brackets associated with the frame and the pair of guide rails and connecting the frame and the pair of guide rails to one another; and
   a vehicle body,
   wherein the frame and the pair of guide rails of the roof apparatus for a vehicle are spatially separated.

7. The vehicle according to claim 6,
   wherein a through-hole is provided in the edge portion, and
   a protrusion portion serving as a regulation portion is provided in the contacting portion of the bracket so as to be inserted through the through-hole.

8. The vehicle according to claim 7, wherein a length of the protrusion portion of the bracket is longer than a distance in which each of the guide rails is movable in the up-and-down direction of the vehicle.

9. The vehicle according to claim 7,
   wherein at least a fixing portion of the bracket is configured by a metal, and
   the fixing portion of the bracket and the frame are coupled together by a welding structure.

10. The vehicle according to claim 6,
    wherein the bracket is fixed to each of the guide rails,
    a contacting portion of the bracket comes into contact with a contacted portion of the frame from below in the up-and-down direction of the vehicle, in an integration state where the frame and the guide rails are connected.

* * * * *